Patented Oct. 30, 1934

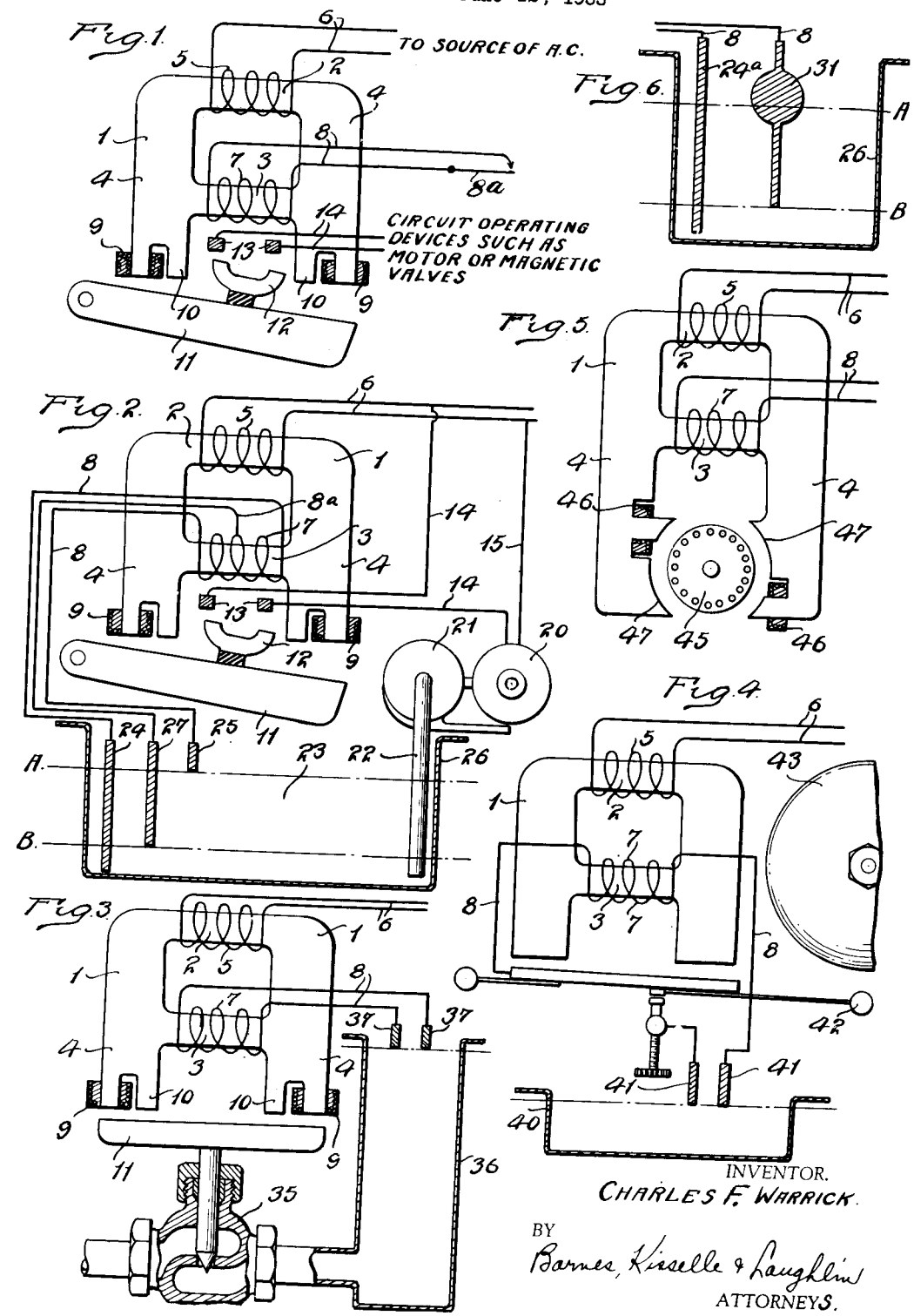

1,979,127

UNITED STATES PATENT OFFICE 1,979,127

ELECTRICAL CONTROL DEVICE

Charles F. Warrick, Detroit, Mich., assignor to Bender Warrick Corporation, Detroit, Mich., a corporation of Michigan Application June 12, 1933, Serial No. 675,457

4 Claims. (Cl. 175—335)

This invention relates to an electrical control device. The invention is concerned particularly with the provision of a device operable on alternating current for governing or controlling the function of any means selected to be controlled. As examples of means to be controlled the following may be cited: control of liquid level, to maintain a substantially constant level, or differential liquid level; to operate a magnetic valve; to operate an alarm; to control the operation of movable mechanism and the like.

Among the objects of the invention is the provision of a device which may be used to the elimination of floats, float valves and all other mechanical features usually associated with the same. This makes for cheapness as the device may be supplied at a cost lower than the total cost of such mechanism and further makes for better operation since there is no mechanical features to get out of order. Other objects of the invention will be appreciated as the detailed description progresses.

Fig. 1 is a view of the device illustrating the essential structure for general application not shown associated with any particular means to be controlled.

Fig. 2 is a diagrammatic view in illustration of the device embodying the invention illustrating the device as it may be used to control a differential fluid level as in the case of a sump pump.

Fig. 3 is a diagrammatic view illustrating how the device may be used in the control of a valve.

Fig. 4 is a view illustrating a device which may be used as an alarm.

Fig. 5 is a diagrammatic view illustrating how the device may be used for the operation of a shaded pole motor.

Fig. 6 is a view illustrating a special type of electrode which may be used in an arrangement such as that shown in Fig. 1.

More specifically, the device of the invention comprises the employment of a magnetic shunt and a controlling action is obtained by the reactive action of a coil effective upon the magnetic shunt. The circuit for this coil which is effective upon the magnetic shunt, may be made and broken, for example, by a conducting liquid. This coil which is effective upon the magnetic shunt, may be termed the controlling coil, so that as the circuit for the controlling coil is made and broken the magnetic field upon which the coil is effective may be caused to operate a suitable armature. This armature may in turn, by its movement, operate to close an electric circuit for any suitable electrically operated means, or it may directly or indirectly operate some mechanism such as a valve, or the armature may itself be a vibrator for an electrical alarm, or it may be a rotatable armature of a motor.

Referring to Fig. 1, it will be noted that a magnetic core 1 is provided which may be generally of A shape. This is an advantageous term to apply to the core having a cross piece 2, another cross piece 3, and legs 4 terminating in poles. A coil 5 encircles the cross bar 2 and it is connected to a source of alternating current by the leads 6. A coil 7 may encircle the cross bar 2 and its leads 8 are to extend to suitable controlling means for making and breaking the circuit. This controlling means, as set forth above, may be a conducting liquid, or it may be a thermostat or any other suitable device for making and breaking the circuit in the coil 7. A thermostatic switch is illustrated at 8a.

The poles may advantageously be bifurcated as shown with one leg of the bifurcated formation of each pole provided with a shading coil 9 leaving one portion of the pole, as at 10, substantially unaffected by the shading coils. An armature is illustrated at 11 and, as shown in Fig. 1, is an ordinary pivoted type of armature, having an insulated conducting bridge 12 for bridging contacts 13 of a circuit employing conductors 14. These conductors extend to any means to be operated.

In Fig. 2 the device is shown in operative relation with a sump pump. It will be noted that when the contacts 13 are bridged that a circuit is made to the motor 20, through the conductors 14 and a conductor 15, which operates a pump 21 having an inlet pipe 22 extending into liquid 23 which may be water. The conductors 8 lead to electrodes 24 and 25, one of which extends into the liquid to a point adjacent the bottom of the vessel 26, and the other of which is designed to be contacted by the liquid only when the liquid reaches the high level A. In this particular instance there is another conductor 8a connected to the coil 7 at an intermediate point and extending to an electrode 27 which projects into the vessel to a point intermediate the electrodes 24 and 25 as indicated by the level B.

Taking up now the operation of the device as thus far described, reference may be made to Fig. 1. The current in the coil 5 sets up a magnetic flux or field and the magnetic flux finds its easiest path through the cross bar 3. This may advantageously be termed a magnetic shunt as the flux shunts across the cross bar 3 and very little of the magnetic flux excited by the coil 5 passes across the gap at the poles. The result is that the armature is not moved and may remain in the position as shown in Fig. 1 with the terminals 13 open. The armature 11 may be held open by a spring or may be merely a gravity control device as desired. The windings of the coil 5 are advantageously such as to produce normal transformer saturation in the core.

Now let it be assumed that some controlling means closes the circuit for the coil 7: A current will therefore flow through this circuit due to the potential set up by transformer action. The effect of this current is to set up a magnetic reaction to the flow of the magnetic flux through the cross bar 3 which has been excited by the coil 5. This provides a reactive action against the flow of the magnetic flux across the shunt, with the result that the flux seeks another path which is across the gap at the poles. This actuates the armature and the bridge 12 bridges the contacts 13 with the result that a circuit is made in the conductors 14, which circuit may operate any suitable device.

The shading coils at the poles serve to reduce or minimize vibration in the armature by delaying a portion of the magnetic flux. The main flux flows across the portions 10 of the poles, and during the zero point of the alternating current, the flux which has been delayed by the shading coils 9 passes across the gap and holds the armature against the poles.

Now, considering the device in the association illustrated in Fig. 2: When the level of the liquid reaches the level A the electrodes 24 and 25 are bridged and the circuit is established in the entire controlling coil. This furnishes sufficient reactive effect to force the magnetic flux shunting through the bar 3 with the result that the flux increases at the gap at the poles and actuates the armature; this in turn closes the circuit to the motor 20 which starts operating the pump. As soon as the level has lowered somewhat, the electrode 25 no longer is in contact with the water, but the electrodes 24 and 27 are both in the water, and a portion of the coil 7 is still energized and the reactive action is reduced but, due to the decreased magnetic reluctance by the closing of the air gap by the armature, the armature is held up against the poles. As soon as the level reaches the level B the electrode 27 is no longer in contact with the water and the reactive magnetic effect is removed, the magnetic flux through the armature is decreased to a value which will not hold the armature which consequently drops, thus opening the motor circuit. As the liquid level builds up from the bottom of the electrode 27 to the bottom of the electrode 25 a portion of the controlling coil is in the closed circuit, but is insufficient to move the armature.

This specific manner of providing three electrodes for a differential liquid level control is but one form which may be used; another form is illustrated in Fig. 6 where there is one electrode 24a and another electrode 30 having an enlarged part 31. When the liquid level rises to the large part there is a sufficient flow of current to provide a reactive action in the controlling coil sufficient to cause armature actuation, and then as the liquid level decreases away from the enlarged part 31 there is sufficient current passing to maintain the armature closed, but which opens as soon as the liquid level passes below the end of electrode 30. As the liquid level rises the current passing from one electrode to another is insufficient to initially actuate the armature until the liquid reaches the enlarged part 31.

In Fig. 3 the armature is directly connected to a valve 35. The liquid level in a vessel 36 may control the making and breaking of a circuit in the controlling coil to result in opening and closing of the valve. To maintain a substantially constant level electrodes 37 may be provided substantially as shown to engage the liquid as it comes up substantially to the desired level and to become disengaged from the liquid as it drops from the desired level. This can also be used with the valve arranged to be closed when armature is up and open when down.

Fig. 4 shows the device in association with an alarm. In this form the armature may be in the form of a vibrator for making and breaking the circuit through the conductors 8 once the circuit has been made by any suitable means as for example, liquid in a vessel 40 coming into contact with electrodes 41. A clapper 42 may be arranged to strike a bell 43. This arrangement may be used in conjunction with a sump pump control as illustrated in Fig. 2 so that if something goes wrong with the pump or if the level of liquid rises above the level A for some abnormal condition, electrodes such as 41, will be contacted by the liquid and the alarm will ring. This arrangement may be also used in conjunction with the arrangement shown in Fig. 3 to give an alarm in the case of any abnormal condition there existing.

It may be desirable to use the device in conjunction with motion translating means for operating some desirable structure. For this purpose, as illustrated in Fig. 5, a shaded pole motor may be provided having a rotary armature 45. The poles have the shading coils 46 and the unaffected pole portions 47. When the circuit in the controlling coil is made the magnetic flux passes across the poles and rotates the armature 45 and this may be connected to any device to be operated through a train of gears or the like.

The several applications, as shown herein, are illustrative only of the broad field of use of the present invention. It may be used for indicating the level of any conducting liquid, as the control for high and low levers, a sump pump control, boiler feed control either gravity filled or injector filled, magnetic valves and the like. Direct control is provided eliminating complicated mechanism. It is to be pointed out that variations may be made in the specific structure which, however, are only shown diagrammatically; for example, the switch controlled by the armature may be any one of several types of known switches such as the well known snap-over type of switch. In the form shown in Fig. 2 one of the conductors 8 may be grounded to the pump thus eliminating the electrode 24. The effect of this, however, is merely to make an electrode out of the inlet pipe 22. In some of the claims use is made of the term "A shaped" for the core; this is done for convenience and such term is intended to cover other equivalent shapes.

I claim:

1. An electrical control device comprising, a coil arranged to be permanently connected to a continuous source of alternating current for continuously exciting alternating magnetic flux, a shunt for the flux, a second coil arranged for the sole purpose of providing reactive action effective upon the shunt, a circuit for the second coil, means operable by an external agency for changing the condition of the said circuit to change the reactive action of the second coil in choking the shunt, a movable armature, the magnetic flux being effective upon the armature when the shunt is choked by the reactive action of the second mentioned coil and being substantially ineffective upon the armature when the choking action is relieved and the flux seeks a path across the shunt, whereby the changing of conditions in the said circuit produces armature movements, and means controlled by armature movement.

2. An electrical control device comprising, a coil arranged to be permanently connected to a continuous source of alternating current for continuously exciting alternating magnetic flux, a shunt for the flux, a second coil arranged for the sole purpose of providing reactive action effective upon the shunt, a circuit for the second coil, said second circuit being arranged to be opened and closed by the making and breaking of the circuit by a positively acting electrical conductor, the reactive action on the shunt being effective when the circuit is closed, a movable armature, said armature being shifted by the magnetic attraction effected by the alternating magnetic flux only when the circuit for the second coil is closed, said armature being substantially unaffected by the magnetic flux when the circuit is open and the flux seeks a path across the shunt, and means controlled by armature movement.

3. An electrical control device comprising, a coil arranged to be permanently connected to a continuous source of alternating current for continuously exciting alternating magnetic flux, a shunt for the flux, a second coil arranged for the sole purpose of providing reactive action effective to choke the magnetic shunt, a circuit for the second coil, the reactive action on the shunt being effective when the circuit is closed, switching means in the circuit and operable to close and open the circuit, a movable armature, moved and held in a position to which it is moved by the magnetic flux excited by said alternating current only when the said circuit is closed by the switching means, and shiftable to its original position upon the opening of said circuit, and beng substantially unaffected by the flux when said circuit is open, and means controlled by the movement of the armature.

4. An electrical control device comprising, a coil arranged to be permanently connected to a continuous source of alternating current for continuously exciting alternating magnetic flux, a shunt for the flux, a second coil arranged for the sole purpose of providing reactive action effective on the magnetic shunt, a circuit for the coil, the reactive action being effective to choke the shunt when the circuit is closed, switching means for said circuit and operable to open and close the circuit, an armature having a definite position and movable to a second definite position, said armature being shifted from one position to the other and held positioned by the magnetic flux excited by the alternating current only when the said circuit is closed by the switching means, and being substantially unaffected by the flux when said circuit is open, whereby the same assumes the other of said positions, and means controlled by armature movement.

CHARLES F. WARRICK.